Dec. 23, 1941. S. WALLACE Re. 21,986

STEAM-GENERATING FLATIRON

Original Filed May 17, 1937 2 Sheets-Sheet 1

Inventor:
Stanley Wallace
By: Richardson & Geier
Attys.

Dec. 23, 1941. S. WALLACE Re. 21,986

STEAM-GENERATING FLATIRON

Original Filed May 17, 1937 2 Sheets-Sheet 2

Inventor:
Stanley Wallace

By: Richardson & Geier

Attys.

Reissued Dec. 23, 1941 Re. 21,986

UNITED STATES PATENT OFFICE 21,986

STEAM-GENERATING FLATIRON

Stanley Wallace, Chicago, Ill.

Original No. 2,237,381, dated April 8, 1941, Serial No. 143,031, May 17, 1937. Application for reissue June 9, 1941, Serial No. 397,283

10 Claims. (Cl. 38—77)

This invention is concerned with an improved flatiron wherein means are provided for safely and efficiently generating and ejecting moisture in the form of steam incident to the use of the iron, thereby eliminating the need for pre-moistening the goods to be ironed and facilitating the progress of the requisite operations as well as improving the quality of the work.

Devices of this general character have been suggested in the past, as is shown, e. g., in the patents to Walker, Re. 16,886, Schwartz, 1,851,-777, and Dickmann, 1,991,381. The structure of the device made in accordance with the present invention is therefore to be considered an improvement which realizes, among others, the new objects and features briefly stated below.

The primary object of the invention is concerned with the provision of a steam-generating flatiron comprising, in a unitary structure, a temperature-controlled heating element and a heat-receiving ironing member, a steam-generating unit mounted on said element in good heat-conducting relation thereto and constituting a boiler, means for supplying a controlled flow of liquid, e. g., water, to the steam-generating unit, a cavity in said unit for receiving said flow of liquid, and means in said cavity providing a large evaporating surface for said liquid and constituting in effect an equivalent to heating coils positioned in the boiler cavity, whereby water disposed therein is effectively converted into steam, together with provisions for ejecting the steam through apertures disposed in the heat-receiving ironing member so as to supply the moisture required for ironing.

Another object relates to the provision of a novel adjustable inlet control valve in combination with the improved device noted in the foregoing paragraph.

Still another object is realized by the provision of a water supply tank forming a part of an embodiment of the device made in accordance with this invention, together with self-regulating means for creating pressure therein for the purpose of controlling the supply of water to be conducted to the steam-generating unit or boiler.

Other objects and features not specifically noted above will be brought out in the course of the detailed description rendered below with reference to the accompanying drawings. In these drawings.

Figures 1, 2:
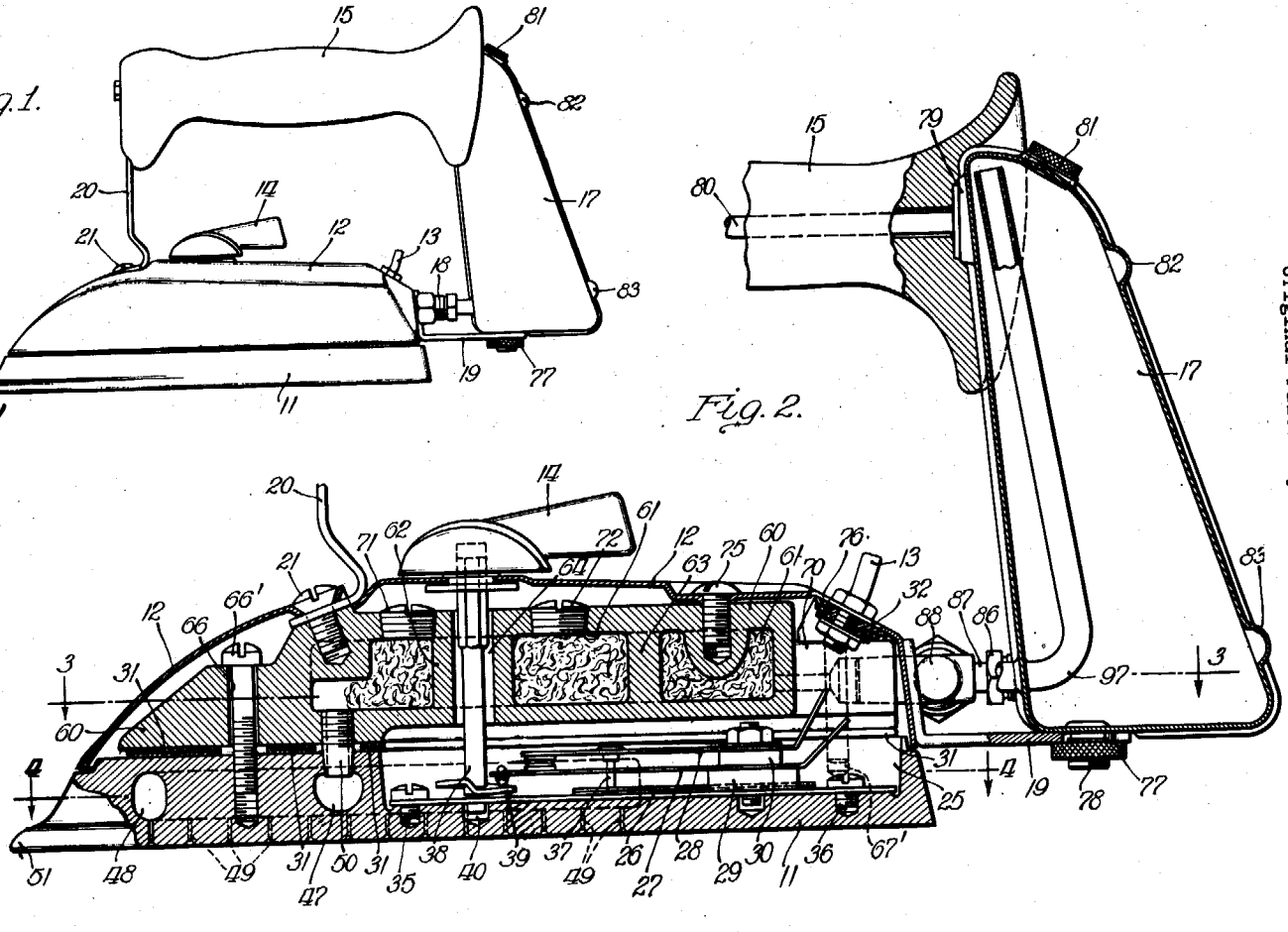
Fig. 1 shows a side elevation of one embodiment of the invention.
Fig. 2 illustrates the structure of Fig. 1, on an enlarged scale, in longitudinal section.
Figure 3:
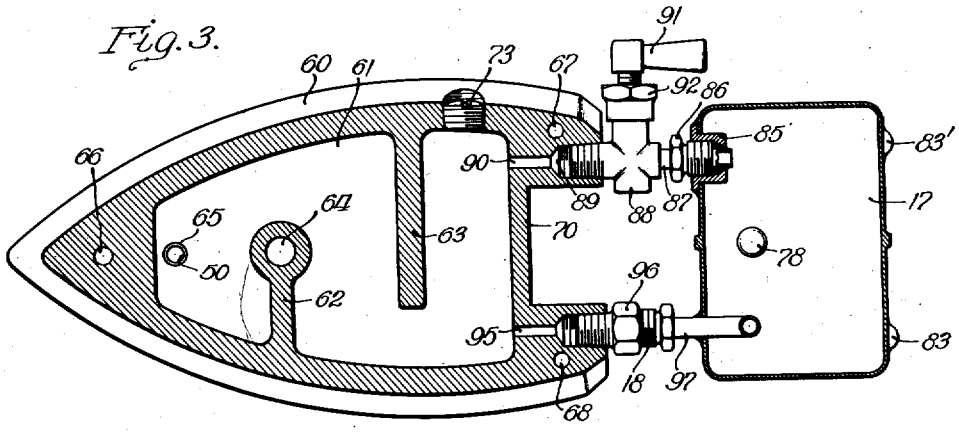
Figure 4:
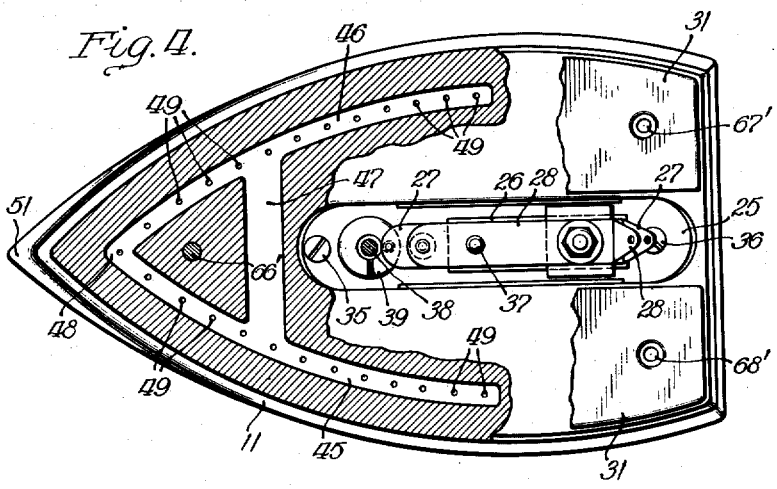
Figure 5:
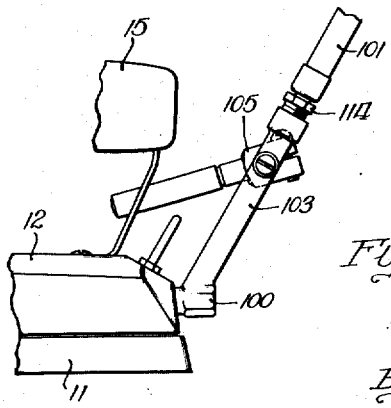

Figs. 3 and 4 represent sections through the device taken on lines 3—3 and 4—4, respectively, of Fig. 2;

Fig. 5 indicates part of a modified structure; and

Figure 6:
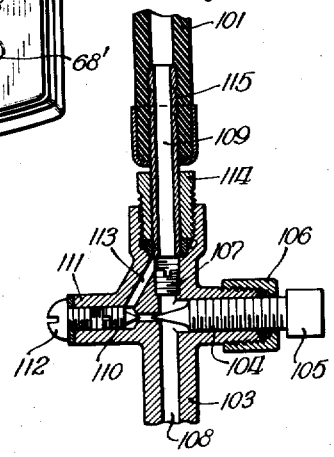

Fig. 6 shows a section through an embodiment of the previously mentioned novel inlet control valve structure.

Referring now to the drawings, in which like parts are designated by like reference numerals, there are shown two principal embodiments of the invention, one of which is fully illustrated in Figs. 1, 2, 3, and 4, and the other of which is indicated in Figs. 5 and 6. In the first case the device is provided with a water supply tank and thus constitutes a self-contained unit, while in the second case the tank may be placed at a distance from the iron and connected with it by a suitable hose. The self-contained embodiment may be used principally for household purposes, and the structure according to Figs. 5 and 6 for industrial purposes.

The self-contained unitary device above intimated comprises, as shown in the elevational view, Fig. 1, the heat-receiving ironing member proper designated by 11, covered by a shell-like casing 12; prongs 13 for connecting current to it, a temperature-regulating lever 14; a handle 15; a tank 17 with suitable supply and pressure-balancing connections, such as shown at 18, leading to the steam-generating or boiler element within the device; and bracket 19 for supporting the tank 17 to prevent any strain that might otherwise be exerted on the pipe and valve connections such as 18. The forward part of the handle 15 is connected with the shell casing of the device by means of a bracket 20, the angular end of which is disposed in a pocket of the casing 12 and fastened to the boiler element in any suitable manner, for example, by means of a screw 21.

The various parts of the embodiment briefly outlined above will now be explained more in detail with reference to Figs. 2, 3, and 4.

The ironing plate or member, per se, indicated at 11, is made of a suitable metal and is provided on its inside with a longitudinal groove or channel 25. In this channel is disposed the thermostat or temperature control element comprising the bi-metal member 26 and contact springs 27 and 28 mounted in spaced relation to each other, as shown, e. g., by means of insulating members such as 29 and 30, which are held in position by a suitable bolt and nut arrangement. The rear end of the lower contact spring 27 may be suitably connected with one pole of the heating element 31 disposed on top of the ironing member, and the corresponding rear end of the upper contact spring 28 may be connected to one of the prongs shown at 13. Two such prongs are of course provided for establishing connection with electric current by the use of a conventional plug, the prongs being attached to a mounting plate 32 (Fig. 2) which is suitably secured in position by screws entering through holes 67—68 (Fig. 3) into threaded openings 67'—68' (Fig. 4) in the ironing plate. The other prong 13 is connected to the opposite pole of the heating element 31. The electrical connection to and circuit of the heating element 31 thus extends from one prong 13 to the heating element 31, and through this element to one contact spring, for example, 27, and then through the closed contacts at the forward part of these springs and through the spring 28, back to the other prong 13. Provided that the contacts at the forward part of springs 27 and 28 are closed and current is connected to the prongs 13 by a suitable plug, current will flow through the heating element 31 disposed between the heat-receiving or ironing member proper 11 and the steam-generating unit or boiler 60 clearly shown in Fig. 2.

The heat control arrangement described above may be furnished as a unit and secured in place in the longitudinal cavity or groove 25 of the ironing member 11 by means of the screws shown at 35 and 36. It is understood, of course, that any other suitable and approved type of temperature control means may be provided in place of the one disclosed herein.

The operation of such a thermostatic control device is well known and need be mentioned only very briefly. As the temperature rises, the bi-metal member 26 will deflect and thereby act against the pin 37 (Figs. 2 and 4) which is firmly attached to the upper contact spring 28, thus lifting this spring with respect to the lower spring 27 upon reaching a certain degree of temperature. This operation opens the contacts carried by the springs 27 and 28 and interrupts the circuit in a well known manner. In order to exercise a control over the degree of temperature at which it is desired that the thermostatic element should interrupt the circuit so as to take care of any given operating conditions, there is provided a shaft 38 carrying a cam member 39 (Figs. 2 and 4). This shaft may be journalled at its lower end in a suitable opening 40 in the ironing member 11. The shaft projects upwardly through the boiler unit and through the casing of the device and is joined with the control handle or lever 14 which may be equipped with a pointer or finger acting against a suitable scale. The latter may be calibrated to the degrees or steps of temperature desired and may indicate the various operating positions of the device in any suitable manner. Thus, when the lever is rotated, it will actuate the shaft 38 and with it the cam 39, and the latter acts against the forward portion of the lower contact spring 27, lifting or lowering the spring as the case may be, altering the initial position of the contacts. In effect, this means that when the springs 27 and 28 are in the highest initial position with respect to the bi-metal member 26, it will take a longer time to open the contacts and to interrupt the circuit than if the contact springs are initially near the bi-metal member. Any temperature operating response may thus be adjusted within the range of the device. If desired, the contact arrangement may be provided with a cutout position wherein the current is entirely disconnected.

The ironing plate 11 is also provided with an internally disposed groove, as shown particularly in the section Fig. 4, which is in the shape of an "A" comprising the two groove wings 45—46 and the central communicating portion 47. Of course, it is understood that the groove may assume any other shape desired or necessary for any particular purpose or reason. The groove wings 45 and 46 meet at the apex point 48, as shown, and each extends back of and within the ironing member for an appreciable portion, while the transverse groove 47 functions as a connecting branch uniting the two groove wings 45 and 46. Small apertures such as 49 connect the groove wings 45 and 46 with the outside and terminate at the bottom portion or bottom surface of the ironing member. The ends of these apertures are flaring to the outside, as indicated in Fig. 2. The transverse groove 47 is connected with the remaining structure through a central opening for receiving a tubular member 50 which is part of and projects from the steam-generating element or boiler unit 60, and is adapted to establish a relatively water- and pressure-tight contact with the opening leading to the groove 47. The manner in which steam is generated will be discussed presently. At this point it may be said that the steam is ejected from the boiler unit 60 through the tubular member 50 into the transverse groove 47 and, inasmuch as this groove communicates with the groove wings 45 and 46, it is clear that the steam will spread throughout the internal grooves of the ironing member and that it will be finally ejected through the apertures 49 in order to provide the proper moisture for the goods to be ironed.

It may be mentioned, in concluding this part of the disclosure, that the lower portion of the ironing element 11 terminates at its forward end in a flat, pointed edge 51 which is particularly adapted to facilitate the ironing work by enabling the operator to enter under projections as well as into crevices and folds which would not receive the desired attention with the ordinary structure of a flatiron having a relatively blunt forward end.

The steam-generating or boiler unit consists of a suitably shaped block 60 (Figs. 2 and 3) which may be made of any suitable material, for example, aluminum, and may be cast with a core so as to furnish an internal convolute cavity 61. When this steam-generating element is viewed in section such as shown in Figs. 2 and 3, the cavity 61 is seen to comprise three distinct portions or chambers separated by the transverse ribs 62 and 63 but communicating with each other. An opening 64 is provided along the center line in the transverse rib 62, as shown, for the purpose of accommodating the shaft 38 of the thermostatic control device previously discussed. The outlet opening 65 of the cavity 61 is located in the forward chamber at the left of the transverse rib 62. This opening is suitably threaded to receive the tubular boss or member 50 which projects downwardly to engage the opening leading to the transverse groove 47 in the ironing element 11, as described previously.

The openings 66, 67, and 68, respectively, shown in Fig. 3, align with corresponding threaded openings such as 67' and 68' in the ironing member 11 (Fig. 4) for the purpose of securing the boiler unit on the ironing member by means of screws, as shown at 66' in Fig. 2. The heating element 31 is interposed between these two elements and is thus securely clamped between them. The mounting plate 32 holding the prongs 13, as discussed before, may be provided with suitable wings, and the fastening screws to be projected through the holes 67 and 68 to enter the threaded openings 67' and 68' may extend through these wings so as to fasten the prong assembly together with the assembly of the boiler and the heat- and steam-receiving ironing member 11. The prongs project to the outside through a suitable opening provided in the shell casing 12.

It will be observed particularly from Fig. 3 that the rear portion of the boiler element 60 is cut out, as noted at 70, for the purpose of providing for the passage of the connecting terminals and the wiring from prongs 13 to the terminal sections of the contact springs 27 and 28 and to the heating element 31, respectively.

The boiler 60 is equipped with a plurality of threaded openings of considerable size for gaining entrance to the interior of the previously noted sectional cavities, and these openings may be closed by means of screw plugs such as indicated at 71, 72, and 73. Any desired and necessary number of such openings and screw plugs may be furnished. In this particular embodiment of the device, the full size of which corresponds approximately to the size indicated in Fig. 2, there are three openings and associated screw plugs, on the upper face of the boiler element, two of which are indicated at 71 and 72, each for permitting access to the corresponding cavity section from the top, and in addition one opening and screw plug 73 at the side of the rearmost cavity section. In order to provide for a large evaporating surface for the generation of steam, I dispose in this convolute cavity and each section thereof a suitable highly heat-conductive metallic fiber material, such as copper wool, which is entered through the plug openings, and the cavities or chambers of the boiler are then sealed by securing the screw plugs in place, as shown. The copper wool or any other desired highly heat-conductive material constitutes in effect a provision which in a sense may be likened to the convolutions of heating coils usually provided in boiler chambers. Inasmuch as the copper wool is in intimate contact with the body of the boiler, the heat is readily transmitted, and each convolution of the copper wool gives off heat for the accelerated generation of steam.

The above described assembly of the ironing plate or member 11 enclosing the thermostatic control, the heating element 31, and the steam-generating unit or boiler 60, is covered by the outside shell 12 which is secured in place by screws such as 21 and 75 (Fig. 2). This shell is provided at its rear end with an opening 76 through which project the prongs 13, as noted before. An angular bracket 19 is directly connected to the center portion of the rear wall of the shell 12 and constitutes a mounting means and support for the tank 70.

The tank may be of any suitable shape, e. g., such as that indicated in the drawings, resting at the bottom on the bracket 19, the end of which may be suitably slotted and secured by means of the knurled nut 77 which attaches to a threaded boss 78 fastened directly to the tank bottom. The upper portion of the tank may be provided with a bushing 79 (Fig. 2) to which is attached the rod 80, and the latter projects through the center opening of the handle 15 and is secured at the forward end to the bracket 20 (Fig. 1). The tank is also equipped with a knurled cap 81 which is in screw-threaded connection with a suitable bushing and provides a means for filling the tank with water. If desired, this cap may be provided with any suitable valve, e. g., a check valve or an adjustable valve. The sloping rear wall of the tank may be equipped with knob-like projections such as 82 and 83, one near each corner, which may be stamped out from the tank material to strengthen the tank wall and may also be used for resting the device with the flat ironing surface of plate 11 in upright position. However, this particular feature is not of any great importance because the usual more substantial rest for the iron will be available under most circumstances of operation.

The tank is also equipped with an outlet bushing 85 (Fig. 3) which may be internally threaded for receiving the gland nut 86, the latter furnishing a pressure- and water-tight connection of the pipe 87 with the tank 17. The pipe 87 connects with a valve 88 screwed into a threaded opening 89 in the boiler and connecting with the duct 90 which terminates in the rearmost section of the cavity 61, as shown in Fig. 3. The valve intake 88 may be an ordinary cock valve provided with a handle 91 and assembled with a gland nut 92, or it may be of a type, as shown in Fig. 6, which will be presently explained more in detail. It is clear that if the valve 88 is open and the tank 17 is filled with water, the water will tend to flow through the valve and through the duct 90 into the cavity 61 of the boiler. However, flooding of the boiler does not take place due to the provision of the self-regulating supply control which will be presently described. It may be noted at this point that the supply of water to the boiler requires a counterpressure which must be generated by the iron.

Assuming now that the iron is connected to current, then the heating element 31 disposed between the steam-generating boiler unit 60 and the ironing member 11 will heat up, and its heat will of course be transmitted directly to the boiler, including the convolution of the copper wool disposed in the cavities 61, and also to the ironing member proper. The atmosphere with the boiler will expand, residual moisture will be evaporated, and pressure is created which escapes in part through the tubular member 50 into the connecting groove 47 of the ironing member 11, and in part through the duct 95 (Fig. 3) into the tank to balance the back pressure tending to retard the flow of water through the valve 88 into the boiler, where it is now continuously converted into steam.

Describing this feature more in detail, part of the steam pressure generated in the boiler cavities is by-passed and conducted into the tank 17 through the duct 95 to which is connected the bushing 96 adapted to receive the gland nut 18. The latter holds the end of the tubular member 97 in water-and pressure-tight engagement with the boiler. The tubular member 97 is of angular shape, as shown in Fig. 2, and projects through the tank wall into the interior of the tank, terminating as shown in the uppermost portion thereof above the water level. Therefore, when pressure is generated in the chambers or cavities of the boiler 60, part of it will go through the duct 95 and through the corresponding connections into the angular tube 97 and will escape in the upper portion of the tank above the water level, thus maintaining the pressure above the water equal to the pressure in the boiler and providing for the proper continuous supply of water through the supply duct 90, according to the setting of the valve 88. The tank and associated parts may be considered a water-injecting device.

The operation of the structure appears to be clear, bearing in mind the functions of the detail parts discussed above.

Briefly stated, the tank 17 is first filled with water, and electric current is connected to the prongs 13 by means of a suitable plug. The thermostatic control lever 14 is set to the desired point, which is established by experience, for any particular type of work. The valve 88 is opened to a desired degree so as to permit the admission of water into the boiler. There is no pressure yet generated in the apparatus and therefore water can seep into the boiler cavities through the supply duct 90. As the iron gradually heats up, pressure is created in the boiler and is relieved partly through the apertures 49 to the outside in the direction of the goods to be ironed, and partly through the duct 95 back into the tank 17. Pressure is now available in the tank to balance the back pressure at duct 90 and water continues to flow through the valve 88 into the boiler. Inasmuch as the boiler is now hot and up to the proper steam-generating temperature, it will be seen that water is immediately and continually converted into steam, and steam is available for the ironing operation.

The amount of steam generated at any given temperature is a function of the amount of water supplied, and is therefore a direct consequence of the setting of the inlet valve. The operator, after a little experience, can adjust the valve, even an ordinary cock valve, so as to provide for the proper flow of supply water to take care of any given temperature conditions. The quality and condition of the steam is, likewise, a function of the amount of water related to the temperature available. The operator, by setting the valve properly, can thus determine the amount of steam and also its quality for any desired or necessary operating requirements, simply by adjusting the temperature control and the water supply in proper relation to each other. Undue pressure, which may be dangerous to the operator or damaging to the device or its proper functions cannot be generated because the entire structure is self-regulating. Steam can always escape from the boiler partly into the tank and partly through the apertures 49 at the bottom face of the ironing member proper and upon the goods to be ironed. Neither can any danger result from the use of the iron in the ordinary way, dispensing entirely with its function as a steam-ejecting device. In this case the entire structure including the boiler element, will heat up without any further results. There is no part that may be damaged by such operation. The device is safe and foolproof, self-regulating, and pressure-balancing. The channel or groove holding the thermostatic element is open to the atmosphere, and this element is thus solely subjected to the temperature conditions of the ironing device.

An alternate embodiment is indicated in Fig. 5. It may correspond in all respects to the structure discussed above except that it is not provided with a water tank. Instead, there is a valve connector member 100 and a suitable flexible hose, for example, a rubber hose 101, leading to a distantly located water supply tank. The water supply depends upon the elevation of the tank and is regulated by the valve provisions. The hose connection is flexible in order to permit the operator to move the iron in any way desired. The valve which may be used in this case is particularly illustrated in Fig. 6. It comprises the tubular portion 103 leading to the connector member 100 for attachment to the device, and having a needle valve 104 operable by a handle member 105 secured to the device by a gland nut 106. Numeral 107 indicates a plug locking the duct 108 against the supply duct 109. Opposite the valve opening adjusted by the valve member 104 is another valve opening as indicated, which is adjusted by the member 110. The latter may be an ordinary set screw, and the opening in the neck 111 may be closed by a gasket and screw 112 to prevent leakage. A duct 113 connects with the supply duct 109 and together with the valve openings described constitutes a by-pass around the plug 107. Numeral 114 represents a gland packing nut for the purpose of establishing a firm connection of the tubular connector member 115 with the device, the hose 109 being attached directly to this connector. Water flows from the distantly located supply tank into this valve through the supply duct 109, by-pass 113, whence it can enter into the duct 108 leading to the iron only in accordance with the setting of the valve 110 which may be termed the master valve. This flow can also be additionally regulated by means of the needle valve 104 operable through the medium of the handle member 105. It will be understood that this valve structure permits any desired setting and adjustment for any determined flow of supply water into the iron. The master valve 110 determines the maximum flow under any condition, while the control valve 104 permits a regulation from zero to this maximum.

A valve structure such as the one just described can of course also be provided in lieu of the valve 88 in the embodiment previously explained.

Attention is called to the fact that the above disclosed device may be used to produce superheated steam. In this case, steam instead of water is fed to the boiler or generator element, and this steam is superheated within the convolute cavity and ejected through the corresponding ducts in the ironing member, as explained. This possibility of using the device in this dual manner is to be considered an especial advantage, particularly when it is desired to use the iron on certain materials such as silk.

Changes may be made as desired or required in any particular instance, and it is therefore understood that I do not want to be strictly held to the precise structure or use shown and described. What is considered new and desired to have protected by Letters Patent of the United States is particularly defined and pointed out in the appended claims.

I claim as my invention:

1. An electric iron comprising an ironing member, a boiler element susperimposed on said member, passageways for the transmission of steam from said boiler element to the face of said ironing member, a cover enclosing said boiler element, a bracket extending to the rear from said cover, a substantially vertical water tank supported on said bracket in spaced relation to the said ironing member and boiler element, a conduit extending substantially horizontally from the lower end of said tank to said boiler element, an upwardly extending bracket secured to said cover near the front end thereof, and a handle secured to the upper end of said last mentioned bracket and to the upper end of said tank.

2. The combination, with an electric iron including steam-generating means, of a water tank for supplying water to said generating means, said tank being of generally upright form, tapering toward the top, and sloping forward from a point below said generating means, means for supporting said tank at the rear of said iron, a rod secured to the upper end of said tank and projecting forwardly over the iron, detachable means for securing the forward end of said rod to said iron, and a handle mounted on said rod.

3. In an electric iron, steam-generating means operated by heat from the iron, a vertical water tank disposed to the rear of the iron and rigidly secured thereto, a handle supported in part on said tank, two conduits extending horizontally between the lower end of said tank and said generating means, one of said conduits opening into the lower end of the tank, and an extension for the other conduit within the tank to carry the conduit opening above the water level.

4. In an electric iron, an ironing member, a boiler element comprising a hollow shell conforming to the shape of the ironing member and secured thereto, overlapping ribs inside said shell dividing the interior into connected sections, a filling of metallic wool packed in said sections, an opening for admitting water to the rearmost section, a steam passage extending from the front section to the said ironing member, relatively large openings in the wall of said shell through which said filling can be inserted or removed, and means for closing said last mentioned openings.

5. In a steam iron, a sole plate having a steam channel at the forward end thereof, there being openings extending from said channel to the face of the sole plate, a recess in the upper side of said sole plate, a boiler superimposed on said sole plate, a heating element between said boiler and sole plate, a thermostatic device in said recess for controlling said heating element, adjusting means for said device including a shaft extending upward through said heating element and said boiler, said boiler including a solid section having an opening for the reception of said shaft, means for rotating said shaft, and a steam passage forward of said recess and shaft extending downward from the front end of the boiler to the said steam channel in the sole plate.

6. In a steam iron, a sole plate having a steam channel therein with openings extending to the face of the sole plate, a boiler superimposed on said sole plate, said boiler being connected with said steam channel and conforming generally in size and shape to the sole plate except at the rear thereof where the boiler element is bifurcated to expose the sole plate beneath, a heating element between said boiler and sole plate, a recess in the top of said sole plate extending from the central portion thereof to the rear, a control device for said heating element mounted in said recess, and electrical connecting means extending downward through the space afforded by the bifurcated rear end of the boiler element to said control device.

7. A boiler for a steam iron, comprising a hollow casting having a rounded toe and two solid sections at the rear which are continuous with the main part of the boiler at the sides but are spaced apart to form a recess at the rear end of the boiler, a horizontal passage in each of said solid sections connecting with the boiler cavity, and partitions extending from opposite sides of said boiler cavity past the center line of the boiler, one of said partitions having an opening therein passing through the boiler from the top to the bottom thereof which forms a communication channel.

8. In a steam-iron, a sole plate having a steam channel at the forward end thereof, there being openings extending from said channel to the face of the sole plate, a boiler superimposed on said sole plate, a heating element between said boiler and sole plate, a thermostatic device also located between said boiler and sole plate, said heating element having an opening therein coextensive with said devcie, adjusting means for said device including a shaft extending upward through said boiler, the said boiler including means providing a channel for said shaft extending from the top of the boiler to the bottom thereof and sealed against the admission of fluid from the interior of the boiler, means above the boiler for rotating said shaft, and a steam passage forward of said shaft extending downward from the front end of the boiler to the said steam channel in the sole plate.

9. In a steam-iron, a sole plate, a boiler superimposed on said sole plate, means for heating the boiler and sole plate, a steam passage extending from the boiler to the sole plate and communicating with openings in the face thereof, a thermostatic device for controlling said heating means and secured to said sole plate beneath the boiler, adjusting means for said device above the boiler, a shaft extending through the boiler between said adjusting means and said device, and means providing a channel for said shaft extending from the top of the boiler to the bottom thereof and sealed against the admission of fluid from the interior of the boiler.

10. In a steam-iron, a sole plate, a boiler superimposed on said sole plate, a steam passage extending from the boiler to the sole plate and communicating with openings in the face thereof, means for heating the boiler and sole plate, a thermostatic device responsive to temperature changes in the sole plate for controlling said heating means, means connecting the upper and lower walls of the boiler and forming a passageway extending through the boiler from top to bottom thereof, adjusting means for said device above the boiler, and mechanical connection between said adjusting means and said device including an element extending through the boiler via said passageway.

STANLEY WALLACE.